(12) United States Patent
Kowalkowski et al.

(10) Patent No.: US 6,804,431 B2
(45) Date of Patent: Oct. 12, 2004

(54) PLUGGABLE OPTICAL TRANSCEIVER ARRAY HAVING WAVELENGTH DIVISION MULTIPLEXING AND DEMULTIPLEXING FEATURES

(75) Inventors: Anthony S. Kowalkowski, Chicago, IL (US); James W. McGinley, Barrington, IL (US); Bruce A. Peterson, Schaumburg, IL (US)

(73) Assignee: Stratos Lightwave, Inc., Chicago, IL (US)

( * ) Notice: Subject to any disclaimer, the term of this patent is extended or adjusted under 35 U.S.C. 154(b) by 210 days.

(21) Appl. No.: 10/195,242

(22) Filed: Jul. 15, 2002

(65) Prior Publication Data

US 2004/0008927 A1 Jan. 15, 2004

(51) Int. Cl.[7] .............................. G02B 6/00; G02B 6/36; G20B 6/28
(52) U.S. Cl. ........................... 385/24; 385/147; 398/115
(58) Field of Search ............................. 385/14–24, 147; 398/115–117, 79

(56) References Cited

U.S. PATENT DOCUMENTS

| | | | | |
|---|---|---|---|---|
| 5,487,124 A | | 1/1996 | Bowen et al. ................. | 385/93 |
| 6,061,481 A | * | 5/2000 | Heidrich et al. ............... | 385/14 |
| 6,142,802 A | | 11/2000 | Berg et al. .................. | 439/180 |
| 6,198,558 B1 | * | 3/2001 | Graves et al. ............... | 398/135 |
| 6,267,606 B1 | | 7/2001 | Poplawski et al. ............ | 439/92 |
| 6,335,869 B1 | | 1/2002 | Branch et al. .............. | 361/816 |
| 6,339,663 B1 | | 1/2002 | Leng et al. .................... | 385/24 |
| 6,350,063 B1 | | 2/2002 | Gilliland et al. .............. | 385/88 |
| 6,371,665 B1 | | 4/2002 | Keska et al. .................. | 385/93 |
| 6,421,150 B2 | * | 7/2002 | Graves et al. ................. | 398/58 |
| 2002/0012138 A1 | * | 1/2002 | Graves et al. ............. | 359/118 |
| 2002/0131259 A1 | * | 9/2002 | Rozy et al. ................. | 361/818 |

OTHER PUBLICATIONS

U.S. patent application Ser. No. 09/938,911, Campbell, filed Aug. 24, 2001.
Tsunami Optics, Inc., Data sheet entitled: "M–4, D–4, mini–metroChannel," (Jun. 2002), published on website at www.tsunamioptics.com, no date.
Tsunami Optics, Inc., Data sheet entitled: "M–8, D–8, mini–metroChannel," (Jun. 2002), published on website at www.tsunamioptics.com, no date.
Tsunami Optics, Inc., Data sheet entitled: "4–Channel CWDM MUX or DEMUX," (Jul. 2002), published on website at www.tsunamioptics.com, no date.
Cisco Systems, Inc., Data sheet entitled: "Cisco CWDM GBIC Solution," (Jul. 2002), published on website at www-.cisco.com, no date.

* cited by examiner

Primary Examiner—Akm Enayet Ullah
(74) Attorney, Agent, or Firm—Karl D. Kovach (57) ABSTRACT

A device includes a housing, two members protruding from the housing, two transmitting optical subassemblies, two receiving optical subassemblies, a multiplexer, and a de-multiplexer. The housing includes two ports for receiving optical fiber connectors. Functionally, the two members act as two standard sized transceivers. The optical outputs of the transmitting optical subassemblies are introduced into the multiplexer and the output of the multiplexer is introduced into one of the two ports of the housing. The optical inputs of the receiving optical subassemblies emanate from the de-multiplexer. The optical data signal input into the de-multiplexer originates from the other port of the two ports of the housing. The two members are attached to the housing in such a way so that when the device is plugged into the receptacle of the host device, the two members can translate in three directions and rotate in three directions relative to the housing.

26 Claims, 9 Drawing Sheets

PLUGGABLE OPTICAL TRANSCEIVER ARRAY HAVING WAVELENGTH DIVISION MULTIPLEXING AND DEMULTIPLEXING FEATURES

BACKGROUND OF THE INVENTION

1. Field of the Invention

The present invention pertains to the field of optoelectronics. The invention more particularly concerns a pluggable transceiver array having optical multiplexing and de-multiplexing features.

2. Discussion of the Background

During the late 1990s and into the early 2000s, optical fiber based data transmission systems flourished. Users of routers and servers or other host devices connect the routers and servers to each other with optical fiber so that the routers and servers can be placed several meters to several kilometers apart. Internally, routers and servers transmit data signals electrically on, typically, copper based conductors. Thus a transducer is required between the optical fiber and the copper conductor so as to convert an optical data signal to an electrical data signal, and to convert an electrical data signal to an optical data signal. Such transducers include GBIC (Gigabit Interface Converter) and SFFP (Small Form Factor Pluggable) transceivers that are well known in the art U.S. Pat. Nos. 6,142,802; 6,267,606; 6,335,869; and 6,350,063 show examples of pluggable transceivers. U.S. Pat. Nos 6,142,802; 6,267,606; 6,335,869; and 6,350,063 are hereby incorporated herein by reference.

As the use of optical fiber and transceiver based systems expanded, new host devices were installed in data center and central office locations. The host devices were connected to each other via optical fibers. The optical fibers were laid over wide areas so as to accommodate metropolitan communication systems which typically involve extensive routing and switching of various nodes (host devices) positioned within optical fiber rings. Since, typically, each transceiver is associated with two optical fibers (one optical fiber carries outgoing data and the other optical fiber carries incoming data) the number of optical fibers populating the host device greatly grew. Then, it became impracticable to lay more optical fiber. Therefore, to increase the bandwidth, wavelength division multiplexing (WDM) was developed so that the transmission capability of a single optical fiber was multiplied. Thus, the preexisting optical fiber which had been laid can now transmit more bandwidth. In such a scenario, more host devices can be brought on-line without more optical fiber being laid. One such wavelength division multiplexing (WDM) system is disclosed in U.S. Pat. No. 6,339,663. U.S. Pat. No. 6,339,663 is hereby incorporated herein by reference.

In an effort to take advantage of the wavelength division multiplexing (WDM) technology, one manufacturer of servers and routers offers a solution which reduces the number of optical fibers running between respective host devices while maintaining the use of pre-existing host devices and no new optical fiber need be laid. Therefore, the solution is transparent to the host devices. In one example, the solution consists of four GBICs, eight optical fiber jumpers cables, and a multiplexer/de-multiplexer box. Bach GBIC converts an optical data signal at a specified frequency, where each of the four GBIC are tuned to a different frequency. The four GBICs are plugged into the host device and each GBIC is linked to the multiplexer/de-multiplexer with two optical fiber jumper cables. The outgoing optical data signals of each of the GBICs are multiplexed by the multiplexing function of the multiplexer/de-multiplexer and all four of the optical data signals exit the multiplexer/de-multiplexer along a single optical fiber. Likewise, the incoming multiplexed system optical data signals carried by a single optical fiber are separated into four optical data signals by the de-multiplexing function of the multiplexer/de-multiplexer. Each of the four optical data signals has a different frequency. Each of the different frequencies of optical data signals or colors of light is connected to the appropriately tuned GBIC for conversion to an electrical data signal.

Figure 1:
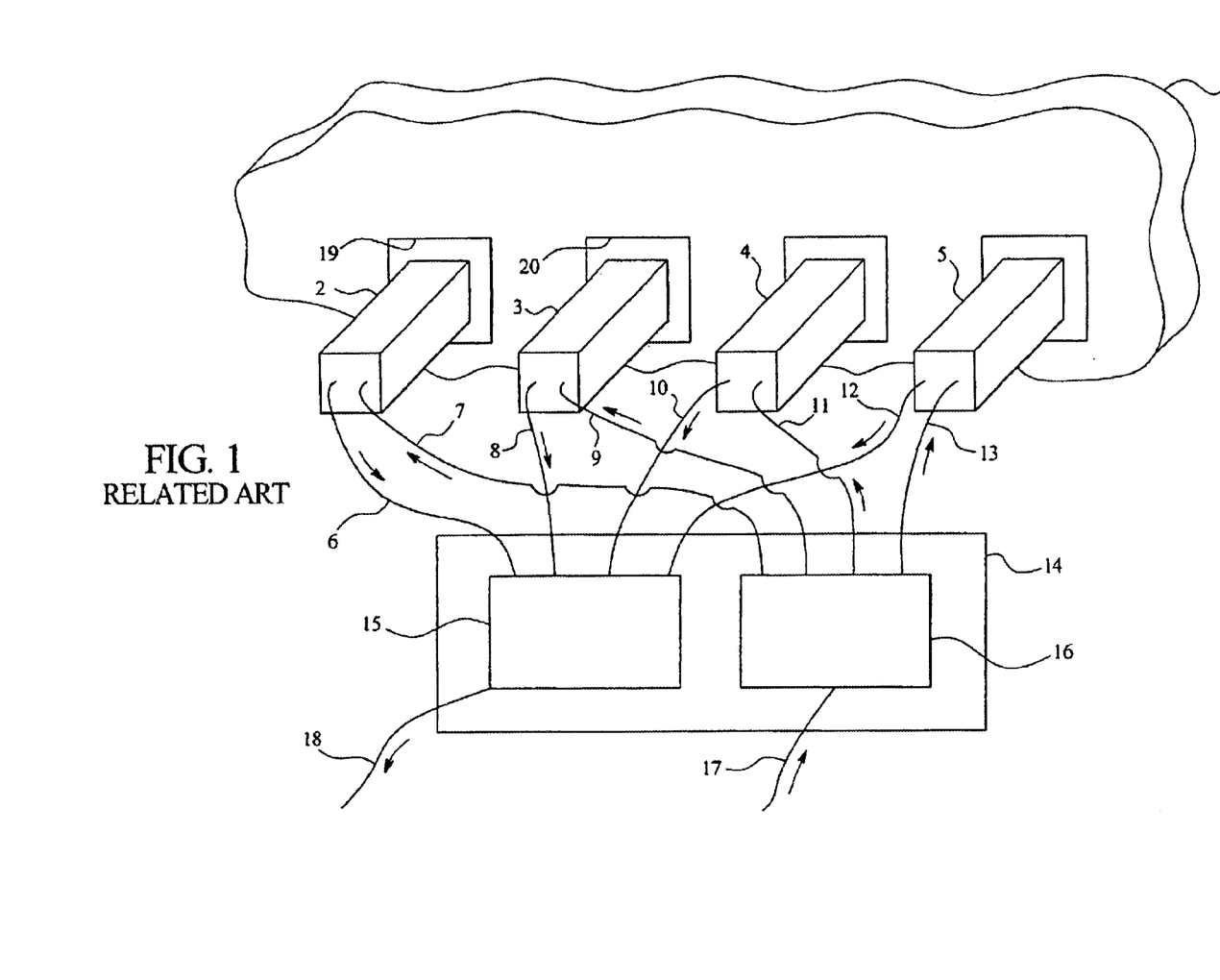
FIG. 1 is a schematic view of a prior art system.

FIG. 1 shows a schematic of such a system, where the host device is identified by numeral designator 1, the transceivers are identified by numeral designators 2, 3, 4, and 5, the optical fiber jumper cables are identified by numeral designators 6, 7, 8, 9, 10, 11, 12, and 13, the multiplexer/de-multiplexer is identified by numeral designator 14, the multiplexing portion is identified by numeral designator 15, the de-multiplexing portion is identified by numeral designator 16, the system input optical fiber is identified by numeral designator 17, and the system output optical fiber is identified by numeral designator 18. The arrows show the flow directions of the optical data signals.

An advantage of the above-identified solution is that the number of optical fibers running between two host devices is reduced by a factor of four. However, the original problem remains between the host device and the multiplexer/de-multiplexer, namely, that the each transceiver or GBIC has two optical fibers running between it and the multiplexer/de-multiplexer. Additionally, a new element has been added to the users' inventory, the multiplexer/de-multiplexer box. Furthermore, the multiplexer/de-multiplexer box occupies valuable real estate in or near the host device thus further crowding data centers and central offices. Thus, the above-identified solution does not reduce the number of optical fibers projecting out of the host device via the transceivers or host devices or other optical transducers. Therefore, users of host devices such as servers and routers seek a solution to reducing the number of optical fibers projecting from the host devices so that the management of the optical fibers is eased while maintaining use of preexisting host devices.

SUMMARY OF THE INVENTION

Therefore, it is an object of the invention to provide a device which includes the transceivers, the optical fibers or waveguides, the multiplexer, and the de-multiplexer, in a single body or housing or structure, where the device is pluggable into a host device or system.

It is another object of the present invention to provide a device which eliminates the need to lay new optical fibers between existing host devices.

It is yet another object of the present invention to provide a device which can self-align multiple members or transceivers relative to the housing of the device and to the host device to which it is plugged.

It is still yet another object of the present invention to provide a device which lowers the power loss of a multiplexing/de-multiplexing system by reducing the number connections between optical components such as receivers, transmitters, multiplexers, de-multiplexers, and optical ports.

In one form of the invention, the device includes a housing, a first member attached to the housing, and a second member attached to the housing. The first member is mounted to the housing so as to provide six degrees of freedom of motion for the first member relative to the housing upon insertion of the first member into a host device. The first member also has electrical contacts for plugging to or from complementary contacts of the host device. The second member is similarly attached to the housing as is the first member. The second member is also similarly constructed as is the first member. The housing includes two optical fiber ports.

In yet another form of the invention, the device includes a third member and a fourth member, where the third and fourth members are attached to the housing and are constructed similar to the first and second members.

In still yet another form of the invention, an optoelectronic transceiver is based upon the structure described in the first above-described device. The optoelectronic transceiver includes a multiplexer, a de-multiplexer, a first receiving optical subassembly, a first transmitting optical subassembly, a second receiving optical subassembly, and a second transmitting optical subassembly. The multiplexer has a first optical input, a second optical input, and a system optical output. The de-multiplexer has a system optical input, a first optical output, and a second optical output. The first receiving optical subassembly converts a first optical data signal at a first frequency to a first electrical data signal, and the first electrical data signal is electrically associated with the electrical contacts of the first member, and the first optical data signal is in optical communication with the first optical output of the de-multiplexer. The first transmitting optical subassembly converts a second electrical data signal to a second optical data signal, and the second electrical data signal is electrically associated with the electrical contacts of the first member, and the second optical data signal is in optical communication with the first optical input of the multiplexer. The second receiving optical subassembly converts a third optical data signal at a second frequency to a third electrical data signal, and the third electrical data signal is electrically associated with the electrical contacts of the second member, and the third optical data signal is in optical communication with the second optical output of the de-multiplexer. The second transmitting optical subassembly converts a fourth electrical data signal to a fourth optical data signal, and the fourth electrical data signal is electrically associated with the electrical contacts of the second member, and the fourth optical data signal is in optical communication with the second optical input of the multiplexer. The first optical data signal and the third optical data signal have different frequencies, and the second optical data signal and the fourth optical data signal have different frequencies. The multiplexer multiplexes the second optical data signal and the fourth optical data signal so as to allow both of the optical data signals to travel down the same optical fiber at the same time. The system output of the multiplexer is in optical communication with the multiplexed system output optical data signals. The multiplexed system output optical data signals are in optical communication with a first optical fiber port of the two optical fiber ports of the housing. The system optical input of the de-multiplexer is in optical communication with multiplexed system input optical data signals. The de-multiplexer separates the multiplexed system input optical data signals into the first optical data signal and the third optical data signal. The multiplexed system input optical data signals are in optical communication with a second optical fiber port of the two optical fiber ports of the housing In another form of the invention, the optoelectronic transceiver, as described above, includes a third member, a fourth, member, and third and fourth transmitting optical subassemblies, and third and fourth receiving optical subassemblies. The multiplexer and de-multiplexer are constructed so as to accept two more optical inputs and optical outputs, respectively. Furthermore, the third and fourth members are similarly attached to the housing as are the first and second members. The third and fourth transmitting optical subassemblies are attached to the transceiver in a likewise manner as are the first and second transmitting optical subassemblies. The third and fourth receiving optical subassemblies are attached to the transceiver in a likewise manner as are the first and second receiving optical subassemblies.

In yet another form of the invention, the optoelectronic transceiver includes a structure, a first member mounted to the structure, a second member mounted to the structure, a multiplexer mounted to the structure, and a de-multiplexer mounted to the structure. The first and second members have respective electrical contacts for plugging into complementary contacts of a host device. The structure has two optical fiber ports for receiving two optical fiber connectors. The multiplexer has a system output which is in optical communication with a first optical fiber port of the two optical fiber ports of the structure. The de-multiplexer has a system input which is in optical communication with a second optical fiber port of the two optical fiber ports of the structure.

In still yet another form of the invention, the device includes a structure, a first member mounted to the structure, and a second member nounted to the structure. The first and second members have respective electrical contacts for plugging into complementary contacts of a host device. The structure has two optical fiber ports for receiving two optical fiber connectors.

In another form of the invention, the optoelectronic transceiver includes a structure, a first member mounted to the structure, a second member mounted to the structure, a multiplexer mounted to the structure, a de-multiplexer mounted to the structure, a first receiving optical subassembly, a first transmitting optical subassembly, a second receiving optical subassembly, and a second transmitting optical subassembly. The first member is mounted to the structure so as to provide six degrees of freedom of motion for the first member relative to the structure upon insertion of the first member into a host device. The first member also has electrical contacts for plugging to or from complementary contacts of the host device. The second member is similarly attached to the structure as is the first member. The second member is also similarly constructed as is the first member. The structure includes two optical fiber ports. The multiplexer has a first optical input, a second optical input, and a system optical output. The de-multiplexer has a system optical input, a first optical output, and a second optical output. The first receiving optical subassembly converts a first optical data signal at a first frequency to a first electrical data signal, and the first electrical data signal is electrically associated with the electrical contacts of the first member, and the first optical data signal is in optical communication with the first optical output of the de-multiplexer. The first transmitting optical subassembly converts a second electrical data signal to a second optical data signal, and the second electrical data signal is electrically associated with the electrical contacts of the first member, and the second optical data signal is in optical communication with the first optical input of the multiplexer. The second receiving optical subassembly converts a third optical data signal at a second frequency to a third electrical data signal, and the third electrical data signal is electrically associated with the electrical contacts of the second member, and the third optical data signal is in optical communication with the second optical output of the de-multiplexer. The second transmitting optical subassembly converts a fourth electrical data signal to a fourth optical data signal, and the fourth electrical data signal is electrically associated with the electrical contacts of the second member, and the fourth optical data signal is in optical communication with the second optical input of the multiplexer. The first optical data signal and the third optical data signal have different frequencies, and the second optical data signal and the fourth optical data signal have different frequencies. The multiplexer multiplexes the second optical data signal and the fourth optical data signal so as to allow both of the optical data signals to travel down the same optical fiber at the same time. The system output of the multiplexer is in optical communication with the multiplexed system output optical data signals. The multiplexed system output optical data signals are in optical communication with a first optical fiber port of the two optical fiber ports of the housing. The system optical input of the de-multiplexer is in optical communication with multiplexed system input optical data signals. The de-multiplexer separates the multiplexed system input optical data signal into the first optical data signal and the third optical data signal. The multiplexed system input optical data signals are in optical communication with a second optical fiber port of the two optical fiber ports of the housing.

Thus, the device of the invention is superior to existing solutions since the device is compact. The compact device integrates all of the stand-alone separate components and integrates them into a single device which is self aligning upon insertion into a router or server or other host device. Thus, the device of the invention is easy to use, occupies less space, has lower power losses, does not require new optical fibers to be laid between existing host devices, and is more cost effective than prior solutions.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings.

DETAILED DESCRIPTION OF THE PRESENTLY PREFERRED EMBODIMENTS

Referring now to the drawings, wherein like reference numerals designate identical or corresponding parts throughout the several views, and more particularly to FIGS. 2–8 thereof, is a device 30.

Figure 2:
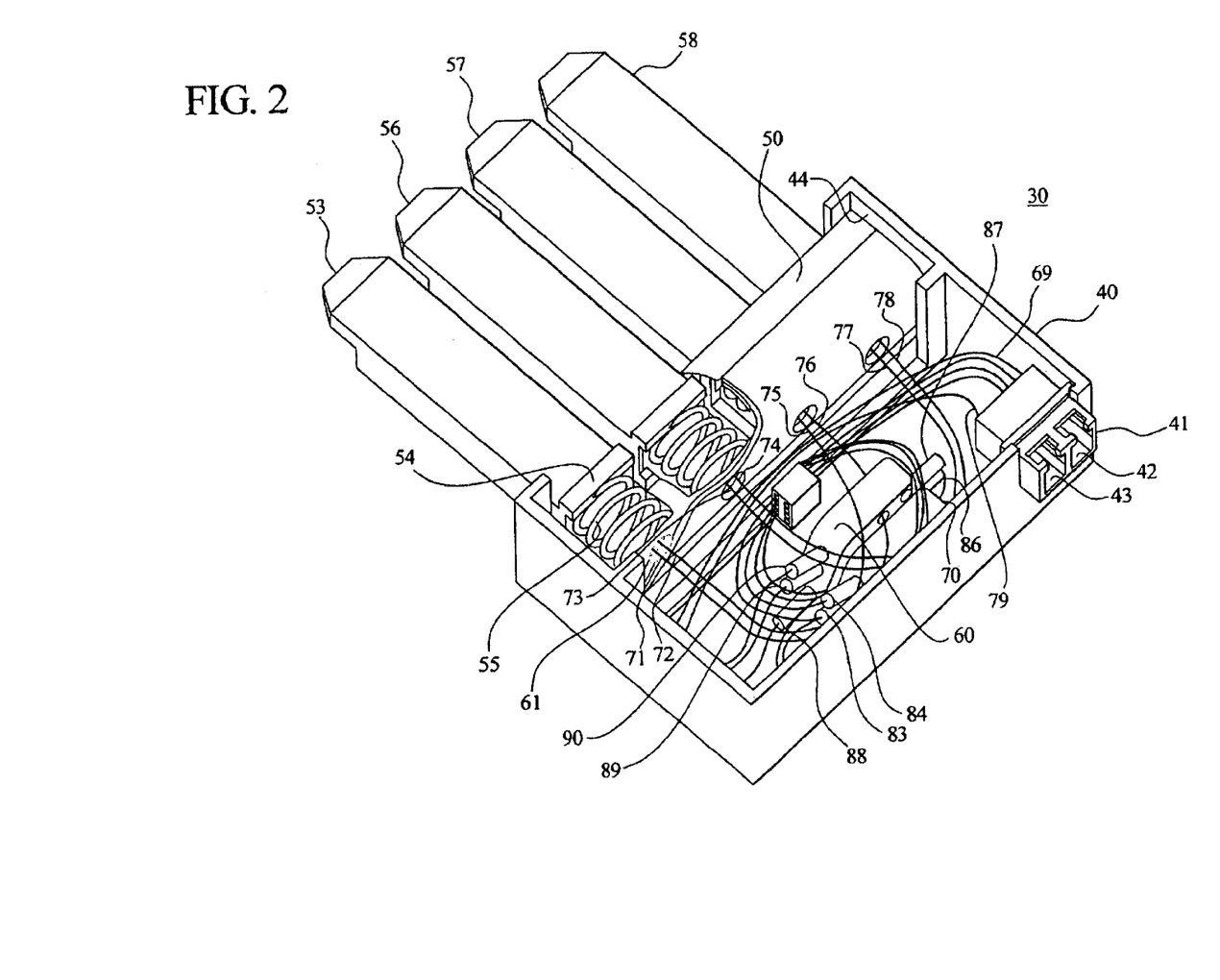
FIG. 2 is a perspective view of the device with a portion of the housing removed.

FIG. 2 is a perspective view of the device 30 with portions of the device removed. The device 30 includes a housing or structure 40, a spring retainer 50, four members or transceivers 53, 56, 57, 58, a multiplexer 60, a de-multiplexer 70, and optical fibers or jumper cables 71, 72, 73, 74, 75, 76, 77, 78. The host device 1 (as shown in FIG. 1) includes receptacles 19, 20 (only two receptacles shown) which are complementary to the spacing and size of the members or transceivers 53, 56, 57, 58 of the device 30 so that the members 53, 56, 57, 58 plug into the respective four receptacles of the host device 1.

The housing or structure 40 includes an optical receptacle 41, and a spring retainer groove 44. The optical receptacle 41 includes a first optical fiber port 42 and a second optical fiber port 43. The spring retainer groove 44 formed in the housing 40 fixes in-place the spring retainer 50 relative to the housing 40. The housing 40 can include an over-molded portion or a cover (both not shown, which maintains the position of the spring retainer 50 relative to the housing 40 if the device 30 were to be inverted. Or, as an alternative, the spring retainer 50 can be press fitted into the spring retainer groove 44 of the housing 40 instead of being slip fitted therein and secured with a cover.

Figure 3:
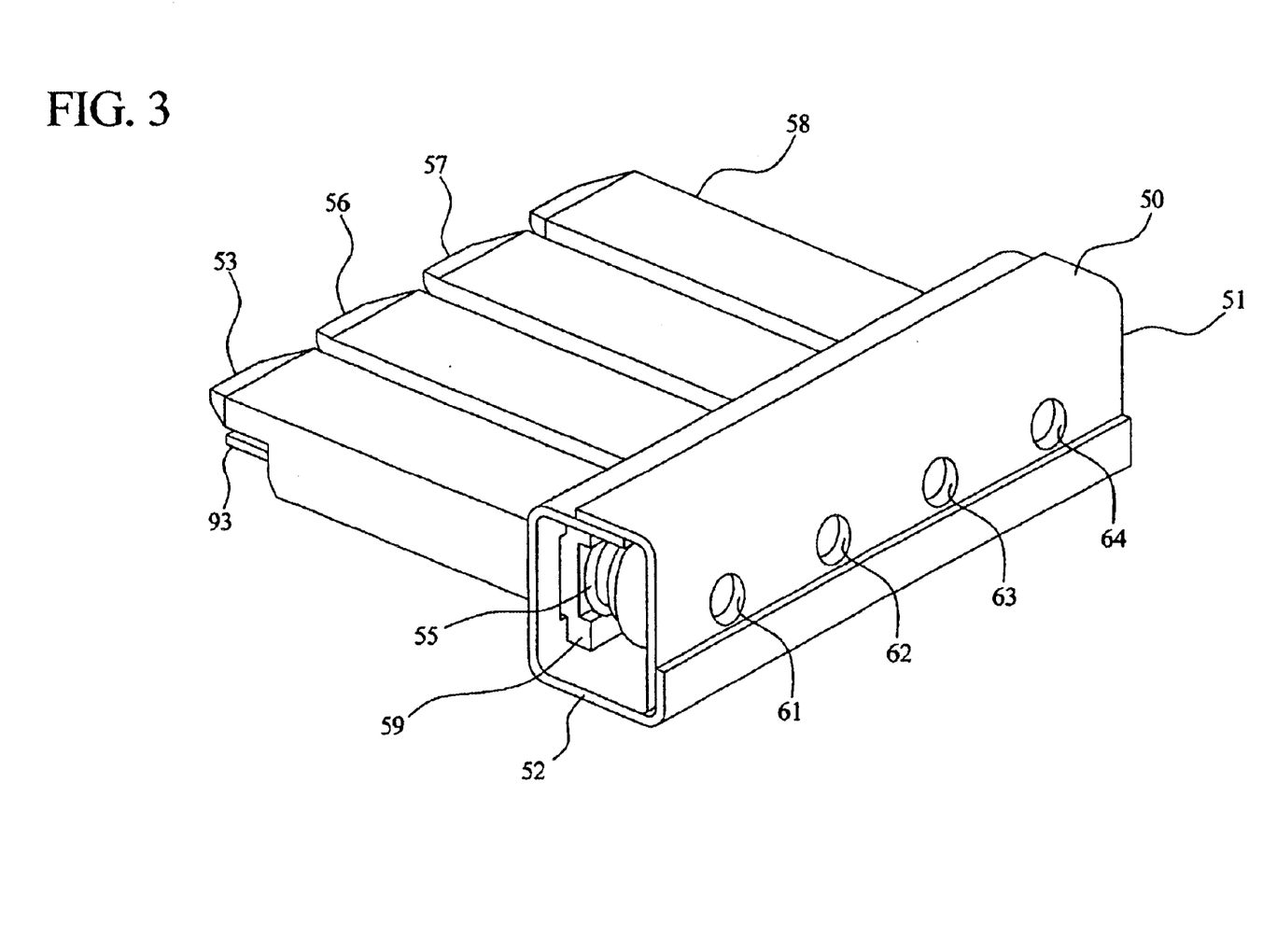
FIG. 3 is a perspective view of the spring retainer of the device of FIG. 2.

FIG. 3 is a perspective view of the spring retainer 50 of the device 30 of FIG. 2. The spring retainer 50 carries the members or transceivers 53, 56, 57, 58. The spring retainer 50 carries the members 53, 56, 57, 58 in such a way that when a certain force is transmitted, in compression, between the members 53, 56, 57, 58 and the spring retainer 50, the members 53, 56, 57, 58 can translate in three orthogonal directions and rotate about three orthogonal axes relative to the spring retainer 50 so as to provide six degrees of freedom between the components. The relative motion between the members 53, 56, 57, 58 and the spring retainer 50 is provided by the mounting of the members 53, 56, 57, 58 to the spring retainer 50. Respective apertures 61, 62, 63, 64 are associated with each of the transceivers or members 53, 56, 57, 58 so as to allow communication lines such as optical fibers or electrical conductors to pass therethrough.

Figure 4:
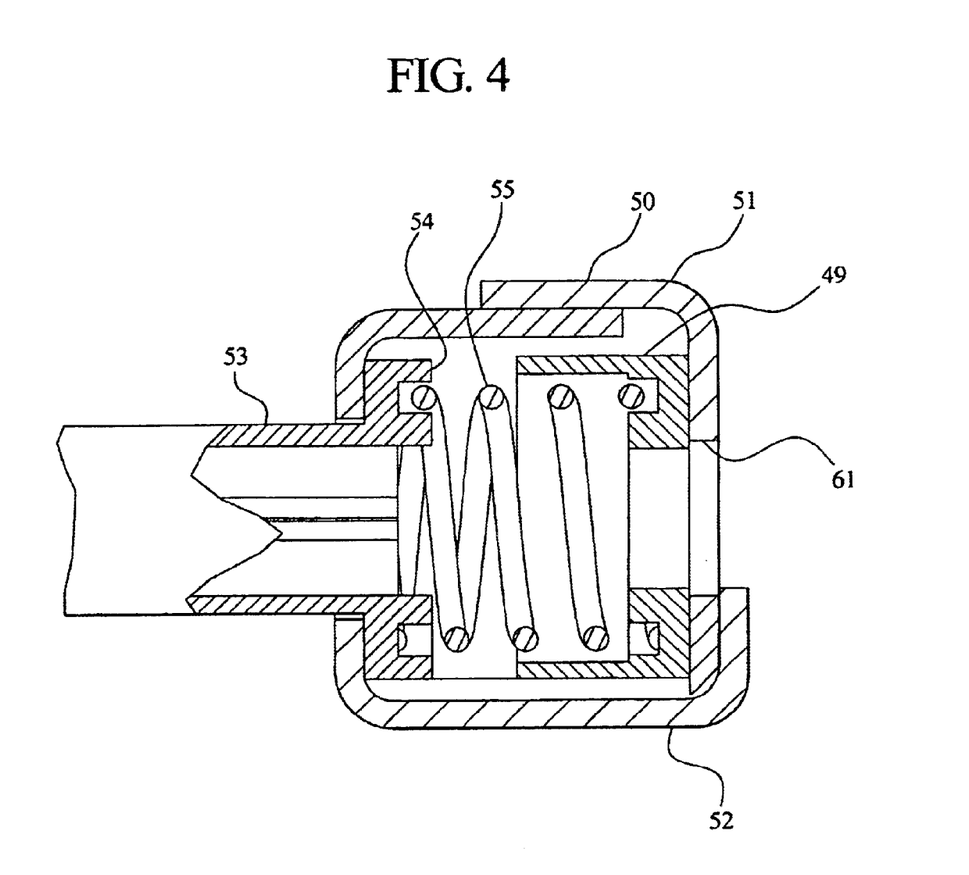
FIG. 4 is a partial cross-sectional view of the first transceiver and the spring retainer of FIG. 2 in an unplugged state.
Figure 5:
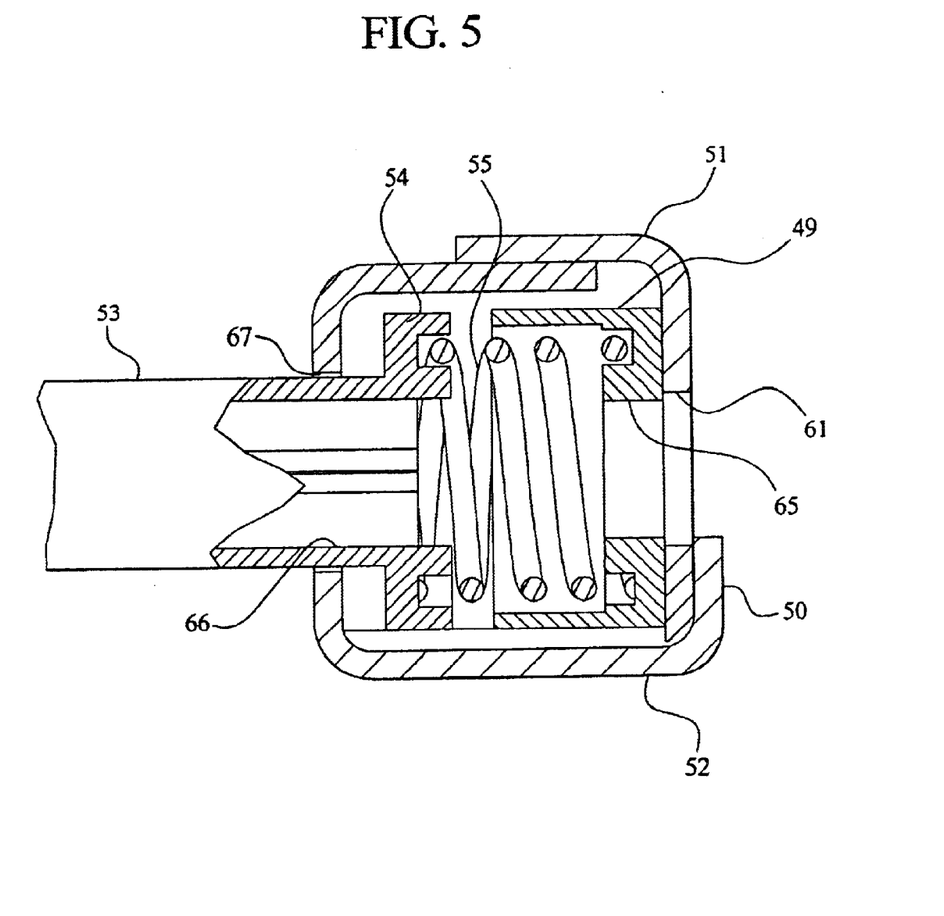
FIG. 5 is a partial cross-sectional view of the first transceiver and the spring retainer of FIG. 5 when the device is being plugged into the host device.

FIG. 4 is a partial cross-sectional view of the first transceiver 53 and the spring retainer 50 of FIG. 2 in an unplugged state. The chassis of the spring retainer 50 includes a first portion 51 and a second portion 52. Mounted within the first portion 51 and the second portion 52 are a first spring seat 49, a second spring seat 54, and a compression spring 55. The first and second portions 51, 52 retain the spring 55, and first and second spring seat 49, 54. One end of the compression spring 55 abuts the first spring seat 49. A second end of the spring 55 abuts the moveable, second spring seat 54. At rest, the spring 55 provides enough force so that the second spring seat 54 contacts the second portion 52 of the spring retainer 50 and so that the first spring seat 49 abuts the first portion 51 of the spring retainer 50. Additionally, the second spring seat 54 is attached to the first member 53. Each transceiver or member 53, 56, 57, 58 is attached by similar techniques. At rest, and when the second spring seat 54 moves relative to the second portion 52 of the spring retainer 50, the first spring seat 49 abuts the first portion 51 of the spring retainer 50 due to the compressive force transmitted by the compression spring 55. However, the first spring seat 49 can slide against the surface of the first portion 51. The first portion 51 is attached to the second portion 52 by common bonding methods or by other methods of attachment which are well known in the art FIG. 5 is a partial cross-sectional view of the first transceiver 53 and the spring retainer 50 of FIG. 4 when the device is being plugged into the host device 1. When the device 30 is plugged into the host device 1, the members or transceivers 53, 56, 57, 58 enter respective ports of the host device. Due to tolerances in the spacing between adjacent members 53, 56, 57, 58 and the tolerances between adjacent ports 19, 20, forces develop which tend to push the members 53, 56, 57, 58 toward the spring retainer 50 and which tend to push or twist the members 53, 56, 57, 58 in a direction transverse to the direction of insertion of the device 30 into the host device 1. Furthermore, once the electrical contacts of the members reach and mate with the complementary contacts of the receptacles of the host device 1, a larger compression force is developed between the members 53, 56, 57, 58 and the spring retainer 50 and is transmitted through the spring 55.

Once the force overcomes the preset compression force locked into the spring 55 at assembly, the second spring seat 54 does not contact the second portion 52 of the spring retainer 50. At that time, the spring seat 54 does not contact the second portion 52, the first transceiver 53 is able to translate in three directions and is able to rotate in three directions, thus having three degrees of motion. Each of the other members 56, 57, 58 is attached to the spring retainer 50 in a similar manner. Such freedom of motion is necessary between the members 53, 56, 57, 58 so that any misalignment and tolerance stack-ups are designed into the device 30 so that the device 30 will be pluggable into the host device 1.

The possibility exists that such a force can be developed, when the device 30 is inserted into the host device 1, that the first spring seat 49 and the second spring seat 54 contact one another. In such a scenario, large forces are developed which ensure that the members of the device 30 are securely positioned within the receptacles of the host device 1.

The second portion 52 has an aperture 67 through which the member 53 passes. The member 53 has an aperture 66 through which optical fibers 71, 72 pass. The optical fibers 71, 72 further pass through an internal diameter of the spring 55 and an aperture 65 of the first spring seat 49 and an aperture 61 of the first portion 51 of the spring retainer 50. Once the external force is removed, the spring 55 re-positions the assembly back towards its unplugged state as shown in FIG. 4.

Figure 6:
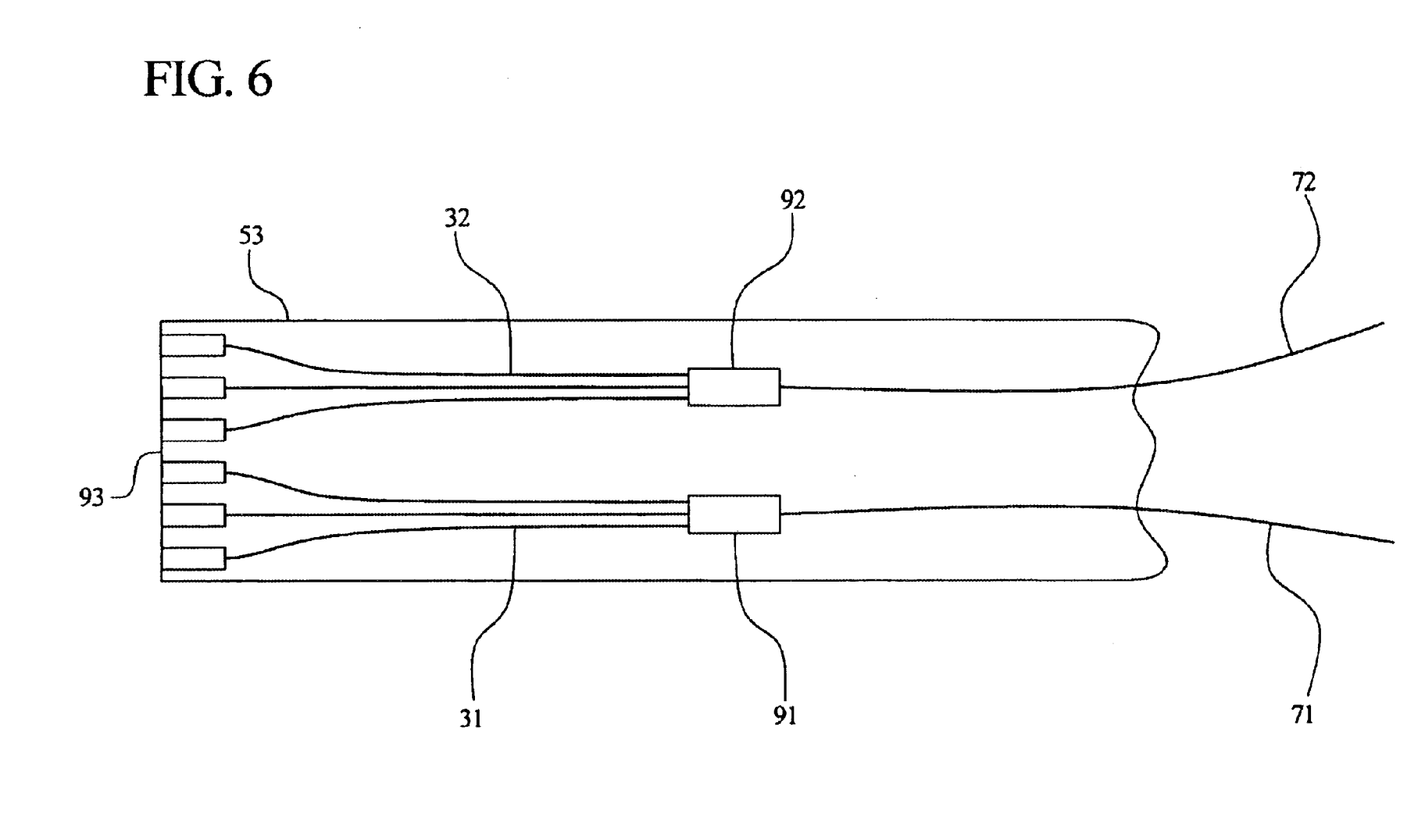
FIG. 6 is a partial cross-sectional view of the first transceiver of the device of FIG. 2.
Figure 7:
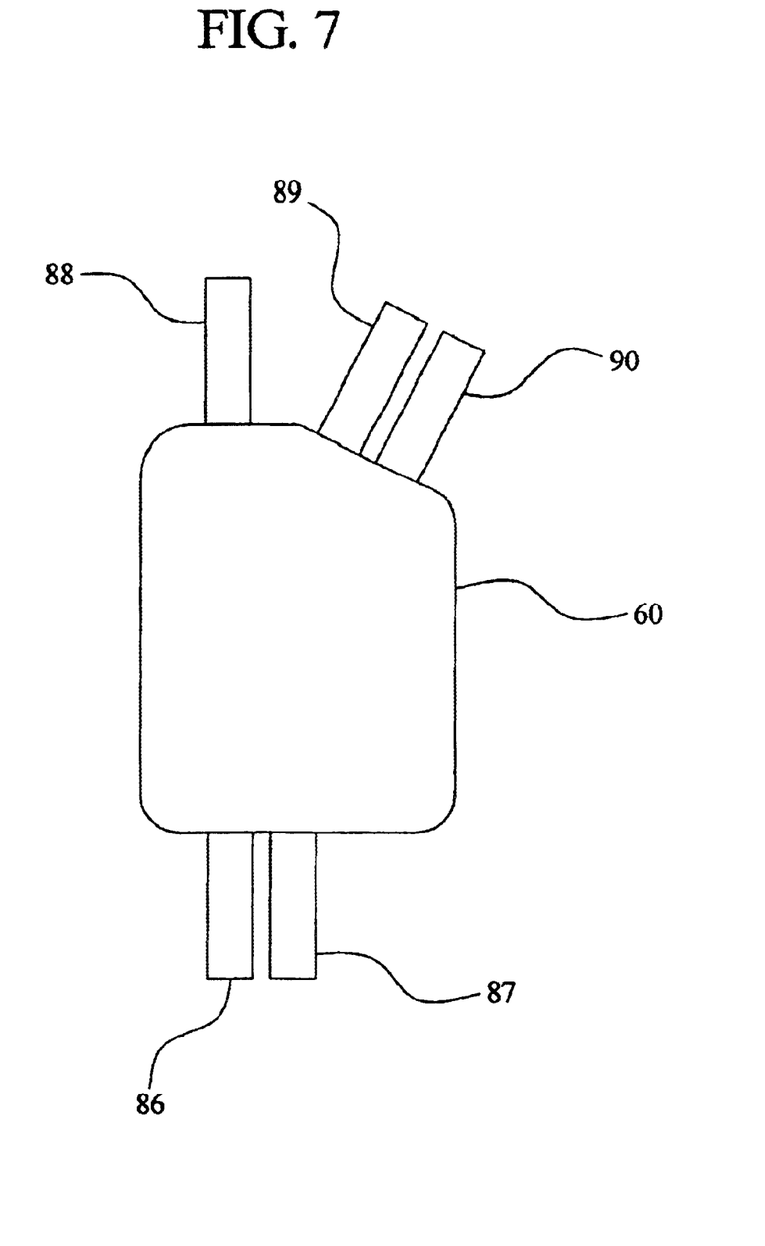
FIG. 7 is a plan view of the multiplexer of the device of FIG. 2.

FIG. 6 is a partial cross-sectional view of the first transceiver 53 of the device 30 of FIGS. 2, and 3. A transmitting optical subassembly 91 is mounted to the transceiver 53 and a receiving optical subassembly 92 is mounted to the transceiver 53. The optical fiber 71 is optically associated with the transmitting optical subassembly 91 by way of a pigtail concept. Electrical conductors 31 attached to the transmitting optical subassembly 91 are in electrical communication with electrical contacts 93. The optical fiber 72 is optically associated with the receiving optical subassembly 92 by way of a pigtail concept. Electrical conductors 32 attached to the receiving optical subassembly 92 are in electrical communication with electrical contacts 93. Electrical data signals reach the transmitting optical subassembly 91 by way of the electrical conductors 31. The transmitting optical subassembly 91 converts the electrical data signal to an optical data signal. The optical data signal is then transmitted along the optical fiber 71. Optical data signals reach the receiving optical subassembly 92 by way of the optical fiber 72. The receiving optical subassembly 92 converts the optical data signal to an electrical data signal. The electrical data signal is then transmitted along the electrical conductors 32. The optical fibers 71, 72 pass through apertures 66, 65, 61 so as to pass through the spring retainer 50 and on to the multiplexer 60 and de-multiplexer 70, respectively. Signal conditioning hardware such as integrated circuit chips, capacitors, resistors, and inductors may be placed on the electrical pathway between the electrical contacts 93 and the transmitting and receiving optical subassemblies 91, 92. For reasons of clarity, the signal conditioning hardware has not been shown FIG. 7 is a plan view of the multiplexer 60 of the device 30 of FIG. 2. The multiplexer 60 has a first optical input 89, a second optical input 90, a third optical input 86, a fourth optical input 87, and a system optical output 88. The first optical fiber or jumper cable 71, which is optically associated with the first transmitting optical subassembly 91 of the first member 53, is also optically associated with the first optical input 89 of the multiplexer 60. The third optical fiber or jumper cable 73, which is optically associated with the second transmitting optical subassembly of the second member 56, is also optically associated with the second optical input 90 of the multiplexer 60. The fifth optical fiber or jumper cable 75, which is optically associated with the third transmitting optical subassembly of the third member 57, is also optically associated with the third optical input 86 of the multiplexer 60. The seventh optical fiber or jumper cable 77, which is optically associated with the fourth transmitting optical subassembly of the fourth member 58, is also optically associated with the third optical input 87 of the multiplexer 60.

During operation, each optical input 86, 87, 89, 90 receives a different color or frequency or wavelength of light, where each different frequency is an optical data signal generated by the respective transmitting optical subassemblies. The multiplexer 60 multiplexes the four different optical data signals so as to produce multiplexed system output optical data signals. The multiplexed system output optical data signals are in optical communication with the system optical output 88 of the multiplexer 60. In turn, the system optical output 88 of the multiplexer 60 is in optical communication with the first optical port 42 of the optical receptacle 41 of the housing 40 via an optical fiber 69. Any method of multiplexing may be used inside the multiplexer 60 in order to multiplex the optical data signals into multiplexed system output optical data signals which travel down a single optical fiber. In fiber Bragg gratings may be used or high pass/slow pass thin film filters may be used to multiplex the optical data signals, other techniques known in the art may also be used. One suitable multiplexer module is marketed by Stratos Lightwave, Inc.'s, Tsunami Optics, Inc., division under the name MINI-METRO CHANNEL M-4.

Figure 8:
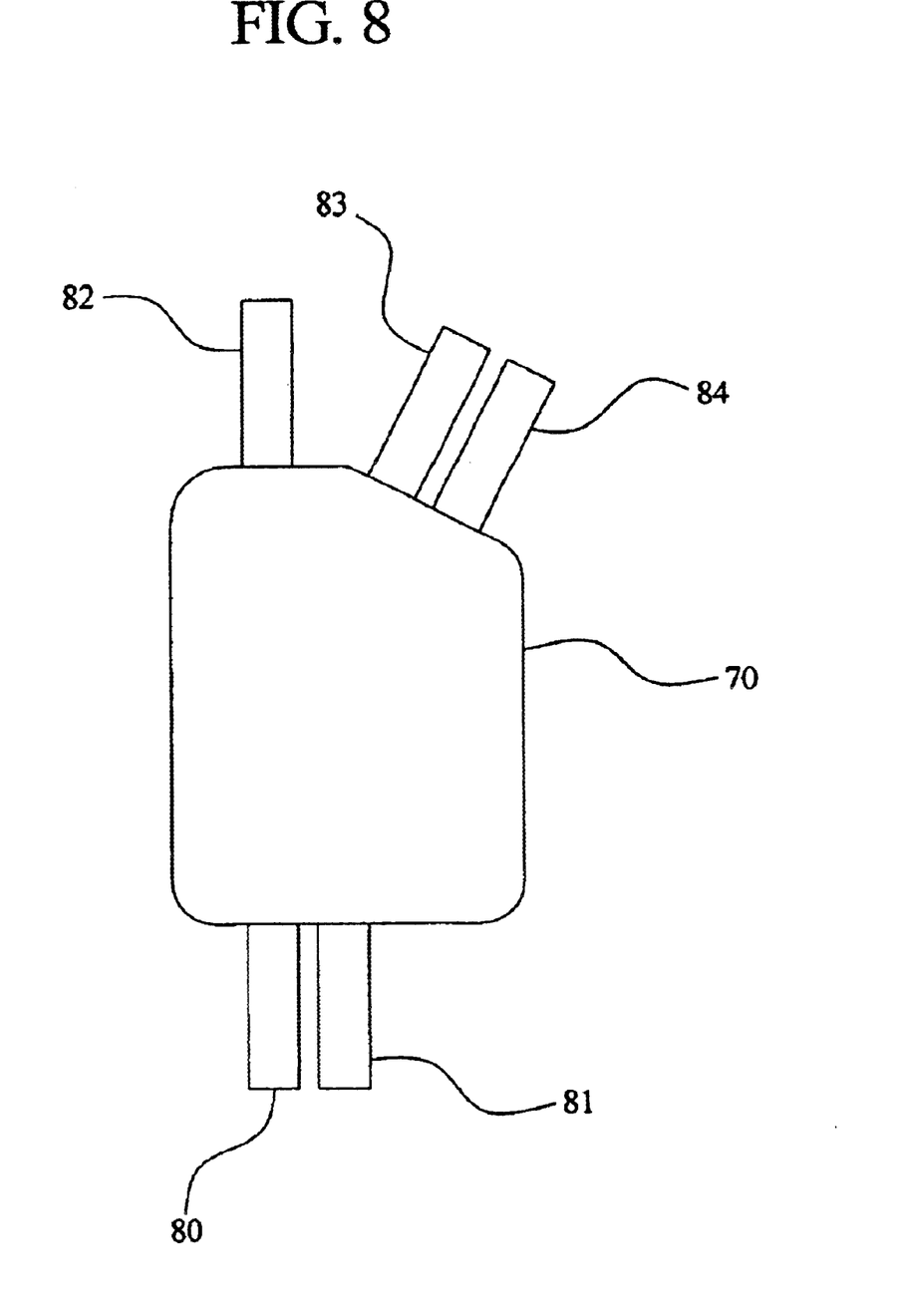
FIG. 8 is a plan view of the de-multiplexer of the device of FIG. 2.

FIG. 8 is a plan view of the de-multiplexer 70 of the device 30 of FIG. 2. The second optical fiber or jumper cable 72, which is optically associated with the first receiving optical subassembly 92 of the first member 53, is also optically associated with the first optical output 80 of the de-multiplexer 70. The fourth optical fiber or jumper cable 74, which is optically associated with the second receiving optical subassembly of the second member 56, is also optically associated with the second optical output 81 of the de-multiplexer 70. The sixth optical fiber or jumper cable 76, which is optically associated with the third receiving optical subassembly of the third member 57, is also optically associated with the third optical output 83 of the de-multiplexer 70. The eighth optical fiber or jumper cable 78, which is optically associated with the fourth receiving optical subassembly of the fourth member 58, is also optically associated with the fourth optical output 84 of the de-multiplexer 70. The system optical input 82 of the de-multiplexer 70 is in optical communication with the second port 43 of the optical receptacle 41 of the housing 40. In turn, the system optical input 82 of the multiplexer 70 is in optical communication with the second optical port 43 of the optical receptacle 41 of the housing 40 via an optical fiber 79.

During operation, the multiplexed system input optical data signals are in optical communication with the system optical input 82 of the de-multiplexer 70. The de-multiplexer 70 separates the multiplexed system input optical data signals into four separate optical data signals, where each of the four optical data signals have a different frequency and each optical data signal is sent down a different optical pathway. Each optical output 80, 81, 83, 84 receives a different color or frequency of light, where each different frequency is an optical data signal which is to be converted to respective electrical data signals by the respective receiving optical subassemblies. Any method of de-multiplexing may be used inside the de-multiplexer 70 in order to separate the multiplexed system input optical data signals into the first optical data signal, the third optical data signal, the fifth optical data signal, and the seventh optical data signal. In fiber Bragg gratings may be used, or high pass/low pass thin film filters may be used to separate the optical data signals, other techniques known in the art may also be used. One suitable de-multiplexer module is marketed by Stratos Lightwave, Inc.'s, Tsunami Optics, Inc., division under the name MINI-METRO CHANNEL D-4. A multiplexer/de-multiplexer is disclosed in U.S. patent application Ser. No. 09/938,911, which was filed on Aug. 24, 2001. U.S. patent application Ser. No. 09/1938,911 is hereby incorporated herein by reference. Furthermore, the other component parts of the device 30 are made of standard engineering materials which are well known) in the art. Additionally, the multiplexer 60 and de-multiplexer 70 can be either of the coarse or dense variety.

FIG. 2 shows a junction box or splicing box 21 interposed between the optical fibers protruding from the transmitting and receiving optical subassemblies of the members 53, 56, 57, 58 and the multiplexer 60 and the de-multiplexer 70. The junction box 21, if used, merely provides for a continuation of the existing terminated optical fiber of the pigtailed optical subassemblies so that the optical subassemblies are in optical communication with the multiplexer and de-multiplexer as is appropriate. The only impact provided by the junction box 21 on the optical data signals is a power loss due to the butt coupling of two optical fibers per each optical data signal. Provided the optical fibers emanating from the optical subassemblies are long enough to reach the respective multiplexer and de-multiplexer, then no junction box 21 is need in the assembly.

Now, assuming the device 30 is plugged into the host device 1, operation of the data flow is described. This description assumes that the junction box 21 is not part of the assembly. First, the flow of data entering the device 30 is described. Then, the flow of data exiting the device 30 is described. The multiplexed system input optical data signals flow through an externally plugged optical fiber situated in the second port 43 of the optical receptacle 41 of the housing 40. The multiplexed system input optical data signals are four different optical data signals each having a discrete and separate frequencies or colors which travel through a single optical fiber. An optical input jumper cable 69 is in optical communication with the second port 43. Therefore, the multiplexed system input optical data signals then flow into the optical input jumper cable 69 which is in optical communication with the system optical input 82 of the de-multiplexer 70. Thus, the multiplexed system input optical data signals enter the de-multiplexer 70.

The de-multiplexer 70 separates the multiplexed system input optical data signals into four separate optical data signals each having a separate frequency or color. The de-multiplexer 70 separates the multiplexed system input optical data signals into a first optical data signal at a first frequency, a third optical data signal at a second frequency, a fifth optical data signal at a third frequency, and a seventh optical data signal at a fourth frequency. The de-multiplexer 70 optically associates the first optical data signal with the first optical output 80, the third optical data signal with the second optical output 81, the fifth optical data signal with the third optical output 83, and the seventh optical data signal with the fourth optical output 84.

The first optical data signal then flows through the second optical jumper cable 72 to the first receiving optical subassembly 92 of the first member 53. The first receiving optical subassembly 92 converts the first optical data signal to a first electrical data signal. The first electrical data signal is in electrical communication with the electrical contacts 93 of the first member 53. The electrical contacts 93 are in electrical communication with complementary contacts of the host device 1 so that the electrical data signal is successfully received therein.

The third optical data signal then flows through the fourth optical jumper cable 74 to the second receiving optical subassembly of the second member 56. The second receiving optical subassembly converts the third optical data signal to a third electrical data signal. The third electrical data signal is in electrical communication with the electrical contacts of the second member 56. The electrical contacts are in electrical communication with complementary contacts of the host device 1 so that the electrical data signal is successfully received therein.

The fifth optical data signal then flows through the sixth optical jumper cable 76 to the third receiving optical subassembly of the third member 57. The third receiving optical subassembly converts the fifth optical data signal to a fifth electrical data signal. The fifth electrical data signal is in electrical communication with the electrical contacts of the third member 57. The electrical contacts are in electrical communication with complementary contacts of the host device 1 so that the electrical data signal is successfully received therein.

The seventh optical data signal then flows through the eighth optical jumper cable 78 to the fourth receiving optical subassembly of the fourth member 58. The fourth receiving optical subassembly converts the seventh optical data signal to a seventh electrical data signal. The seventh electrical data signal is in electrical communication with the electrical contacts of the fourth member 58. The electrical contacts are in electrical communication with complementary contacts of the host device 1 so that the electrical data signal is successfully received therein.

Now, the transmit function is discussed. A second electrical data signal flows to the first transmitting optical subassembly 91 from the host device 1 through the electrical contacts 93 of the first member 53 which in turn is in electrical communication with the complementary contacts of the host device 1. The first transmitting optical subassembly 91 converts the second electrical data signal to a second optical data signal. The second optical data signal then flows though the first optical jumper cable 71. The first optical jumper cable 71 is in optical communication with the first optical input 89 of the multiplexer 60. Thus, the second optical data signal enters the multiplexer 60 through the first optical input 89.

A fourth electrical data signal flows to the second transmitting optical subassembly from the host device 1 through the electrical contacts of the second member 56 which in turn is in electrical communication with the complementary contacts of the host device 1. The second transmitting optical subassembly converts the fourth electrical data signal to a fourth optical data signal. The fourth optical data signal then flows though the third optical jumper cable 73. The third optical jumper cable 73 is in optical communication with the second optical input 90 of the multiplexer 60. Thus, the fourth optical data signal enters the multiplexer 60 through the second optical input 90.

A sixth electrical data signal flows to the third transmitting optical subassembly from the host device 1 though the electrical contacts of the third member 57 which in turn is in electrical communication with the complementary contact of the host device 1. The third transmitting optical subassembly converts the sixth electrical data signal to a sixth optical data signal. The sixth optical data signal then flows though the fifth optical jumper cable 75. The fifth optical jumper cable 75 is in optical communication with the third optical input 86 of the multiplexer 60. Thus, the sixth optical data signal enters the multiplexer 60 through the third optical input 86.

An eighth electrical data signal flows to the fourth transmitting optical subassembly from the host device 1 through the electrical contacts of the fourth member 58 which in turn is in electrical communication with the complementary contacts of the host device 1. The fourth transmitting optical subassembly converts the eighth electrical data signal to an eighth optical data signal. The eighth optical data signal then flows though the seventh optical jumper cable 77. The seventh optical jumper cable 77 is in optical communication with the fourth optical input 87 of the multiplexer 60. Thus, the eighth optical data signal enters the multiplexer 60 through the fourth optical input 87.

The second optical data signal, the fourth optical data signal, the sixth optical data signal, and the eighth optical data signal each have a different discrete and separate frequency or color. The multiplexer 60 multiplexes the second optical data signal, the fourth optical data signal, the sixth optical data signal, and the eighth optical data signal into a multiplexed system output optical data signals which are in optical communication with system optical output 88 of the multiplexer 60. The system optical output 88 of the multiplexer 60 is in optical communication with the optical output jumper cable 69. The multiplexed system output optical data signals then flow into the optical output jumper cable 69. The optical output jumper cable 69 is in optical communication with the first port 42 of the optical receptacle 41 of the housing 40. Thus, the multiplexed system output data signals then flow into an externally plugged optical fiber situated in the first port 42 and, as such, the multiplexed system output optical data signals exit the device 30. Typically, the first and second ports 42, 43 are configured to accept optical connectors conforming to the LC standard.

Figure 9:
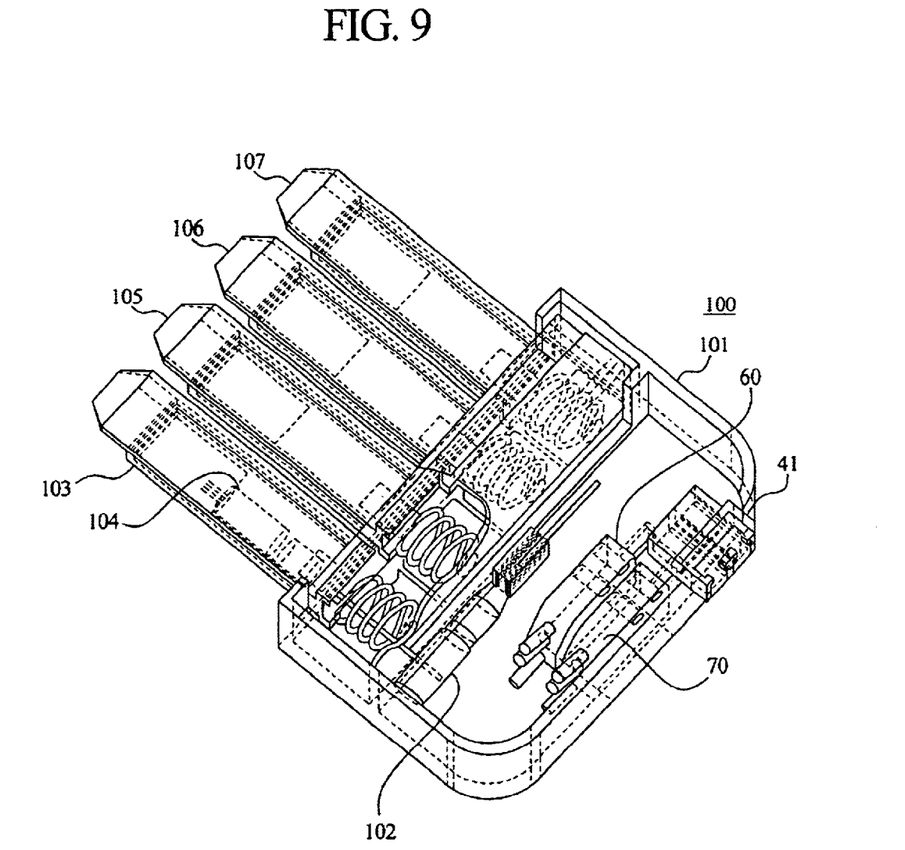
FIG. 9 is a partial perspective view of another embodiment of the device.

FIG. 9 is a partial perspective view of another embodiment of the device 100. The device 100 is functionally the same as device 30 shown in FIGS. 2–8, however, the optical subassemblies 102 (one shown) are removed from the members 103, 105, 106, 107 and are carried within the housing or structure 101. For comparison purposes only, one pigtailed optical subassembly 104 is shown in phantom line on member 103, however device 100 does not have any optical subassemblies mounted on the members 103, 105, 106, 107. Electrical conductors travel from the optical subassembly 102 to the electrical contacts of the member 103 through the apertures of the spring retainer as described in the previous embodiment. Other aspects of the device 100 are the same as the device 30 such as the multiplexer 60, the de-multiplexer 70, and the optical port 41. This embodiment of the device 100 keeps all of the optics and optical connections within the housing 101. For reasons of clarity, optical fiber and optical and electrical connections are not shown.

In both embodiments 30, 100 can have optical fiber ports 42, 43 which conform to any one of the following standards: SC, MU, SC, and ST. Furthermore, the device of the invention may include just the housing and the structural portion of the members devoid of the optical subassemblies. Additionally, the device of the invention may include the housing, the members, and only receiving optical subassemblies and a de-multiplexer so that the device acts as a receiver only. The receiver requires only one external optical fiber connected to the housing so as to receive the multiplexed optical data signals. Alternatively, the device of the invention may include the housing, the members, and only transmitting optical subassemblies and a multiplexer so that the device acts as a transmitter only. The transmitter requires only one external optical fiber connected to the housing so as to transmit the multiplexed optical data signals to another device such as a receiver. Furthermore, the center wavelengths of the optical data signals are typically composed of wavelengths defined within the range 1270 nanometers to 1610 nanometers spaced by 20 nanometers.

It is also envisioned in another embodiment that the structure can contain a single fiber optic port which accepts a single optical fiber instead of the two optical fibers as described above. The single optical fiber transmits optical data in two directions and is known as being bi-directional. The structure or housing of the invention would contain filters or gratings which adds or drops the optical signals to or from the single optical fiber connected to the structure.

Obviously, numerous modifications and variations of the present invention are possible in light of the above teachings. It is therefore to be understood that within the scope of the appended claims, the invention may be practiced otherwise than as specifically described herein.

What is claimed is:

1. An optoelectronic transceiver comprising:
  a structure having two optical fiber ports for receiving two optical fiber connectors;
  a first member mounted to the structure, the first member having electrical contacts for plugging to or from complementary contacts of the host device;
  a second member mounted to the structure, the second member having electrical contacts for plugging to or from complementary contacts of the host device;
  a multiplexer attached to the structure, the multiplexer having a system output, the system output of the multiplexer being in optical communication with a first optical fiber port of the two optical fiber ports of the structure; and
  a de-multiplexer attached to the structure, the de-multiplexer having a system input, the system input of the de-multiplexer being in optical communication with a second optical fiber port of the two optical fiber ports of the structure.

2. An optoelectronic transceiver comprising:
  a structure having two optical fiber ports for receiving two optical fiber connectors;
  a first member mounted to the structure, the first member having electrical contacts for plugging to or from complementary contacts of the host device;

a second member mounted to the structure, the second member having electrical contacts for plugging to or from complementary contacts of the host device;

a multiplexer attached to the structure, the multiplexer having a first optical input, a second optical input, and a system output;

a de-multiplexer attached to the structure, the de-multiplexer having a system optical input, a first optical output, and a second optical output;

a first receiving optical subassembly converts a first optical data signal at a first frequency to a first electrical data signal, the first electrical data signal is electrically associated with the electrical contacts of the first member, the first optical data signal is in optical communication with the first optical output of the de-multiplexer;

a first transmitting optical subassembly converts a second electrical data signal to a second optical data signal the second electrical data signal is electrically associated with the electrical contacts of the first member, the second optical signal is in optical communication with the first optical input of the multiplexer;

a second receiving optical subassembly converts a third optical data signal at a second frequency to a third electrical data signal, the third electrical data signal is electrically associated with the electrical contacts of the second member, the third optical data signal is in optical communication with the second optical output of the de-multiplexer, and a second transmitting optical subassembly converts a fourth electrical data signal to a fourth optical data signal, the fourth electrical data signal is electrically associated with the electrical contacts of the second member, the fourth optical signal is in optical communication with the second optical input of the multiplexer, and wherein the first optical data signal and the third optical data signal have different frequencies, and the second optical data signal and the fourth optical data signal have different frequencies, and wherein the multiplexer multiplexes the second optical data signal and the fourth optical data signal so as to produce multiplexed system output optical data signals, the system output of the multiplexer is in optical communication with the multiplexed system output optical data signals, and the multiplexed system output optical data signals are in optical communication with a first optical fiber port of the two optical fiber ports of the structure, and wherein the system optical input of the de-multiplexer is in optical communication with multiplexed system input optical data signals, the de-multiplexer separates the multiplexed system input optical data signals into the first optical data signal and the third optical data signal, and the multiplexed system input optical data signals are in optical communication with a second optical fiber port of the two optical fiber ports of the structure.

3. A device comprising:

a structure having two optical fiber ports for receiving two optical fiber connectors;

a first member mounted to the structure, the first member having electrical contacts for plugging to or from complementary contacts of the host device; and a second member mounted to the structure, the second member having electrical contacts for plugging to or from complementary contacts of the host device.

4. A transceiver array for plugging to or from a host device, the transceiver array comprising:

a housing having two optical fiber ports for receiving two optical fiber connectors;

a first transceiver mounted to the housing so as to provide six degrees of freedom of motion for the first transceiver relative to the housing upon insertion of the first transceiver into the host device, the first transceiver having a first receiving optical subassembly and a first transmitting optical subassembly, the first transceiver having electrical contacts for plugging to or from complementary contacts of the host device, the fist receiving optical subassembly converts a first optical data signal having a first frequency to a first electrical data signal, the first transmitting optical subassembly converts a second electrical data signal to a second optical data signal;

a second transceiver mounted to the housing so as to provide six degrees of freedom of motion for the second transceiver relative to the housing upon insertion of the second transceiver into the host device, the second transceiver having a second receiving optical subassembly and a second transmitting optical subassembly, the second transceiver having electrical contacts for plugging to or from complementary contacts of the host device, the second receiving optical subassembly converts a third optical data signal having a second frequency to a third electrical data signal, the second transmitting optical subassembly converts a fourth electrical data signal to a fourth optical data signal;

a third transceiver mounted to the housing so as to provide six degrees of freedom of motion for the third transceiver relative to the housing upon insertion of the third transceiver into the host device, the third transceiver having a third receiving optical subassembly and a third transmitting optical subassembly, the third transceiver having electrical contacts for plugging to or from complementary contacts of the host device, the third receiving optical subassembly converts a fifth optical data signal having a third frequency to a fifth electrical data signal, the third transmitting optical subassembly converts a sixth electrical data signal to a sixth optical data signal;

a fourth transceiver mounted to the housing so as to provide six degrees of freedom of motion for the fourth transceiver relative to the housing upon insertion of the fourth transceiver into the host device, the fourth transceiver having a fourth receiving optical subassembly and a fourth transmitting optical subassembly, the fourth transceiver having electrical contacts for plugging to or from complementary contacts of the host device, the fourth receiving optical subassembly converts a seventh optical data signal having a fourth frequency to a seventh electrical data signal, the third transmitting optical subassembly converts an eighth electrical data signal to an eighth optical data signal;

a coarse wavelength division multiplexer having a first optical input, a second optical input, a third optical input, a fourth optical input, and a system optical output, the first optical input receives the second optical data signal from the first transceiver, the second optical input receives the fourth optical data signal from the second transceiver, the third optical input receives the sixth optical data signal from the third transceiver, the fourth optical input receives the eighth optical data signal from the fourth transceiver, the multiplexer multiplexes the second optical data signal, the fourth optical data signal, the sixth optical data signal, and the eighth optical data signal so as to produce multiplexed system output optical data signals, the system optical output receives the multiplexed system output optical data signals, and wherein the multiplexed system output optical data signals are in optical communication with a first optical port of the two optical ports of the housing, and wherein the second optical data signal and the fourth optical data signal have different frequencies, the fourth optical data signal and the sixth optical data signal have different frequencies, the sixth optical data signal and the eighth optical data signal have different frequencies, the second optical data signal and the sixth optical data signal have different frequencies, the second optical data signal and the eighth optical data signal have different frequencies, and the fourth optical data signal and the eighth optical data signal have different frequencies; and a coarse wavelength division de-multiplexer having a system optical input, a first optical output, a second optical output, a third optical output, and a fourth optical output, the first optical output receives the first optical data signal at the first frequency, the second optical output receives the third optical data signal at the second frequency, the third optical output receives the fifth optical data signal at the third frequency, the fourth optical output receives the seventh optical data signal at the fourth frequency, the system optical input receives multiplexed system input optical data signals, the de-multiplexer separates the multiplexed system input optical data signals into the first optical data signal, the third optical data signal, the fifth optical data signal, and the seventh optical data signal, and wherein the multiplexed system input optical data signals are in optical communication with a second optical port of the two optical ports of the housing, and wherein the first optical data signal and the third optical data signal have different frequencies, the third optical data signal and the fifth optical data signal have different frequencies, the fifth optical data signal and the seventh optical data signal have different frequencies, the first optical data signal and the fifth optical data signal have different frequencies, the first optical data signal and the seventh optical data signal have different frequencies, and the third optical data signal and the seventh optical data signal have different frequencies.

5. A transceiver array according to claim 4 wherein the first optical fiber port of the two optical fiber ports of the housing conforms to a standard selected from the group consisting of LC, MU, SC, and ST.

6. A transceiver array according to claim 5 wherein the second optical fiber port of the two optical fiber ports of the housing conforms to a standard selected from the group consisting of LC, MU, SC, and ST.

7. An optoelectronic transceiver comprising:

a housing having two optical fiber ports for receiving two optical fiber connectors;

a first member mounted to the housing so as to provide six degrees of freedom of motion for the first member relative to the housing upon insertion of the first member into a host device, the first member having electrical contacts for plugging to or from complementary contacts of the host device;

a second member mounted to the housing so as to provide six degrees of freedom of motion for the second member relative to the housing upon insertion of the second member into the host device, the second member having electrical contacts for plugging to or from complementary contacts of the host device;

a multiplexer attached to the housing, the multiplexer having a first optical input, a second optical input, and a system output;

a de-multiplexer attached to the housing, the de-multiplexer having a system optical input, a first optical output, and a second optical output;

a first receiving optical subassembly converts a first optical data signal at a first frequency to a first electrical data signal, the first electrical data signal is electrically associated with the electrical contacts of the first member, the first optical data signal is in optical communication with the first optical output of the de-multiplexer;

a first transmitting optical subassembly converts a second electrical data signal to a second optical data signal, the second electrical data signal is electrically associated with the electrical contacts of the fist member, the second optical signal is in optical communication with the first optical input of the multiplexer;

a second receiving optical subassembly converts a third optical data signal at a second frequency to a third electrical data signal, the third electrical data signal is electrically associated with the electrical contacts of the second member, the third optical data signal is in optical communication with the second optical output of the de-multiplexer; and a second transmitting optical subassembly converts a fourth electrical data signal to a fourth optical data signal, the fourth electrical data signal is electrically associated with the electrical contacts of the second member, the fourth optical signal is in optical communication with the second optical input of the multiplexer, and wherein the first optical data signal and the third optical data signal have different frequencies, and the second optical data signal and the fourth optical data signal have different frequencies, and wherein the multiplexer multiplexes the second optical data signal and the fourth optical data signal so as to produce multiplexed system output optical data signals, the system output of the multiplexer is in optical communication with the multiplexed system output optical data signals, and the multiplexed system output optical data signals are in optical communication with a first optical fiber port of the two optical fiber ports of the housing, and wherein the system optical input of the de-multiplexer is in optical communication with multiplexed system input optical data signals, the de-multiplexer separates the multiplexed system input optical data signals into the first optical data signal and the third optical data signal, and the multiplexed system input optical data signals are in optical communication with a second optical fiber port of the two optical fiber ports of the housing.

8. An optoelectronic transceiver according to claim 7 wherein the multiplexer is a coarse wavelength division multiplexer.

9. An optoelectronic transceiver according to claim 8 wherein the de-multiplexer is a coarse wavelength division de-multiplexer.

10. An optoelectronic transceiver according to claim 9 wherein the first optical fiber port of the two optical fiber ports of the housing conforms to a standard selected from the group consisting of LC, MU, SC, and ST.

11. An optoelectronic transceiver according to claim 10 wherein the second optical fiber port of the two optical fiber ports of the housing conforms to a standard selected from the group consisting of LC, MU, SC, and ST.

12. An optoelectronic transceiver according to claim 7 wherein the multiplexer is a dense wavelength division multiplexer.

13. An optoelectronic transceiver according to claim 12 wherein the de-multiplexer is a dense wavelength division de-multiplexer.

14. An optoelectronic transceiver comprising:

a housing having two optical fiber ports for receiving two optical fiber connectors;

a first member mounted to the housing so as to provide six degrees of freedom of motion for the first member relative to the housing upon insertion of the first member into a host device, the first member having electrical contacts for plugging to or from complementary contacts of the host device;

a second member mounted to the housing so as to provide six degrees of freedom of motion for the second member relative to the housing upon insertion of the second member into the host device, the second member having electrical contacts for plugging to or from complementary contacts of the host device;

a third member mounted to the housing so as to provide six degrees of freedom of motion for the third member relative to the housing upon insertion of the third member into the host device, the third member having electrical contacts for plugging to or from complementary contacts of the host device;

a fourth member mounted to the housing so as to provide six degrees of freedom of motion for the fourth member relative to the housing upon insertion of the fourth member into the host device, the fourth member having electrical contacts for plugging to or from complementary contacts of the host device;

a multiplexer attached to the housing, the multiplexer having a first optical input, a second optical input, a third optical input, and a system output;

a de-multiplexer attached to the housing, the de-multiplexer having a system optical input, a first optical output, a second optical output, a third optical output, and a fourth optical output;

a first receiving optical subassembly converts a first optical data signal at a first frequency to a first electrical data signal, the first electrical data signal is electrically associated with the electrical contacts of the first member, the first optical data signal is in optical communication with the first optical output of the de-multiplexer;

a first transmitting optical subassembly converts a second electrical data signal to a second optical data signal, the second electrical data signal is electrically associated with the electrical contacts of the first member, the second optical signal is in optical communication with the first optical input of the multiplexer;

a second receiving optical subassembly converts a third optical data signal at a second frequency to a third electrical data signal, the third electrical data signal is electrically associated with the electrical contacts of the second member, the third optical data signal is in optical communication with the second optical output of the de-multiplexer;

a second transmitting optical subassembly converts a fourth electrical data signal to a fourth optical data signal, the fourth electrical data signal is electrically associated with the electrical contacts of the second member, the fourth optical signal is in optical communication with the second optical input of the multiplexer;

a third receiving optical subassembly converts a fifth optical data signal at a third frequency to a fifth electrical data signal, the fifth electrical data signal is electrically associated with the electrical contacts of the third member, the fifth optical data signal is in optical communication with the third optical output of the de-multiplexer;

a third transmitting optical subassembly converts a sixth electrical data signal to a sixth optical data signal, the sixth electrical data signal is electrically associated with the electrical contacts of the third member, the sixth optical signal is in optical communication with the third optical input of the multiplexer;

a fourth receiving optical subassembly converts a seventh optical data signal at a fourth frequency to a seventh electrical data signal the seventh electrical data signal is electrically associated with the electrical contacts of the fourth member, the seventh optical data signal is in optical communication with the fourth optical output of the de-multiplexer; and a fourth transmitting optical subassembly converts an eighth electrical data signal to an eighth optical data signal, the eighth electrical data signal is electrically associated with the electrical contacts of the fourth member, the eighth optical signal is in optical communication with the third optical input of the multiplexer, and wherein the first optical data signal and the third optical data signal have different frequencies, and the second optical data signal and the fourth optical data signal have different frequencies, and wherein the fifth optical data signal and the seventh optical data signal have different frequencies, and the sixth optical data signal and the eighth optical data signal have different frequencies, and wherein the first optical data signal and the fifth optical data signal have different frequencies, the first optical data signal and the seventh optical data signal have different frequencies, the second optical data signal and the sixth optical data signal have different frequencies, the second optical data signal and the eighth optical data signal have different frequencies, the third optical data signal and the fifth optical data signal have different frequencies, the third optical data signal and the seventh optical data signal have different frequencies, the fourth optical data signal and the sixth optical data signal have different frequencies, and the fourth optical data signal and the eighth optical data signal have different frequencies, and wherein the multiplexer multiplexes the second optical data signal, the fourth optical data signal the sixth optical data signal, and the eighth optical data signal so as to produce multiplexed system output optical data signals, the system output of the multiplexer is in optical communication with the multiplexed system output optical data signals, and the multiplexed system output optical data signals are in optical communication with a first optical fiber port of the two optical fiber ports of the housing, and wherein the system optical input of the de-multiplexer is in optical communication with multiplexed system input optical data signals, the de-multiplexer separates the multiplexed system input optical data signals into the first optical data signal, the third optical data signal, the fifth optical data signal, and the seventh optical data signal and the multiplexed system input optical data signals are in optical communication with a second optical fiber port of the two optical fiber ports of the housing.

15. An optoelectronic transceiver according to claim 14 wherein the multiplexer is a coarse wavelength division multiplexer.

16. An optoelectronic transceiver according to claim 15 wherein the de-multiplexer is a coarse wavelength division de-multiplexer.

17. An optoelectronic transceiver according to claim 16 wherein the first optical fiber port of the two optical fiber ports of the housing conforms to a standard selected from the group consisting of LC, MU, SC, and ST.

18. An optoelectronic transceiver according to claim 17 wherein the second optical fiber port of the two optical fiber ports of the housing conforms to a standard selected from the group consisting of LC, MU, SC, and ST.

19. An optoelectronic transceiver according to claim 14 wherein the multiplexer is a dense wavelength division multiplexer.

20. An optoelectronic transceiver according to claim 19 wherein the de-multiplexer is a dense wavelength division de-multiplexer.

21. A device comprising:

a housing having two optical fiber ports for receiving two optical fiber connectors;

a first member mounted to the housing so as to provide six degrees of freedom of motion for the first member relative to the housing upon insertion of the first member into a host device, the first member having electrical contacts for plugging to or from complementary contacts of the host device; and a second member mounted to the housing so as to provide six degrees of freedom of motion for the second member relative to the housing upon insertion of the second member into the host device, the second member having electrical contacts for plugging to or from complementary contacts of the host device.

22. A device according to claim 21 wherein the first optical fiber port of the two optical fiber ports of the housing conforms to a standard selected from the group consisting of LC, MU, SC, and ST.

23. A device according to claim 22 wherein the second optical fiber port of the two optical fiber ports of the housing conforms to a standard selected from the group consisting of LC, MU, SC, and ST.

24. A device comprising:

a housing having two optical fiber ports for receiving two optical fiber connectors;

a first member mounted to the housing so as to provide six degrees of freedom of motion for the first member relative to the housing upon insertion of the first member into a host device, the first member having electrical contacts for plugging to or from complementary contacts of the host device;

a second member mounted to the housing so as to provide six degrees of freedom of motion for the second member relative to the housing upon insertion of the second member into the host device, the second member having electrical contacts for plugging to or from complementary contacts of the host device;

a third member mounted to the housing so as to provide six degrees of freedom of motion for the third member relative to the housing upon insertion of the third member into the host device, the third member having electrical contacts for plugging to or from complementary contacts of the host device; and a fourth member mounted to the housing so as to provide six degrees of freedom of motion for the fourth member relative to the housing upon insertion of the fourth member into the host device, the fourth member having electrical contacts for plugging to or from complementary contacts of the host device.

25. A device according to claim 24 wherein the first optical fiber port of the two optical fiber ports of the housing conforms to a standard selected from the group consisting of LC, MU, SC, and ST.

26. A device according to claim 25 wherein the second optical fiber port of the two optical fiber ports of the housing conforms to a standard selected from the group consisting of LC, MU, SC, and ST.

* * * * *